June 13, 1961 L. J. PIANOWSKI 2,988,014
CARRIER STOP
Filed Jan. 7, 1959 2 Sheets-Sheet 1
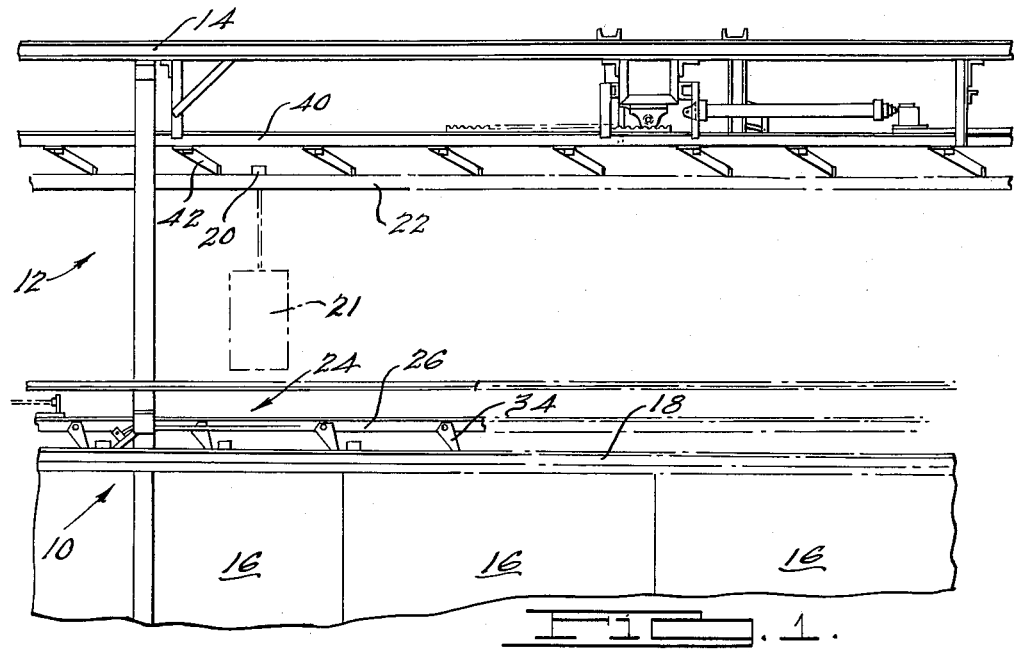
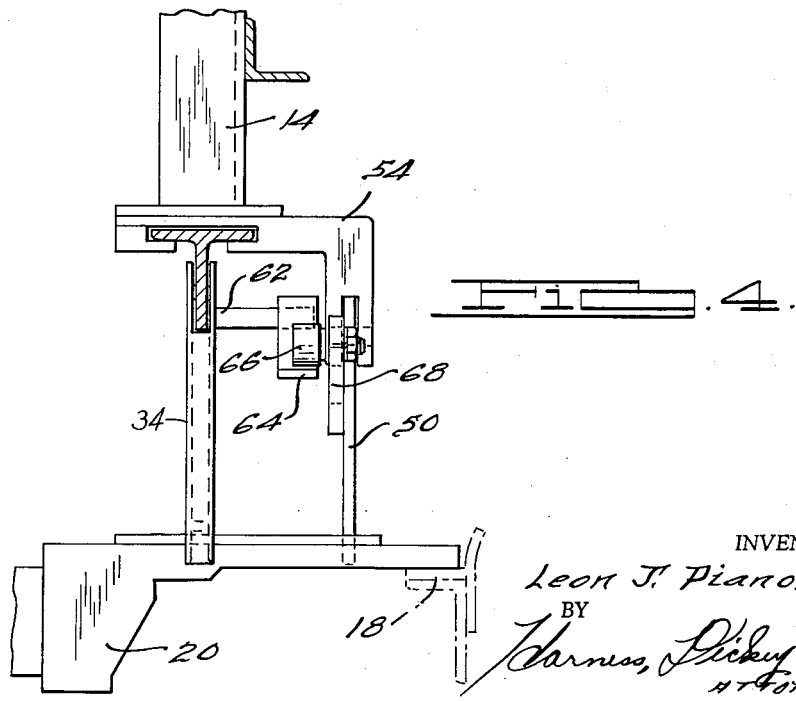
INVENTOR.
Leon J. Pianowski.
BY
Harness, Dickey & Pierce
ATTORNEYS.

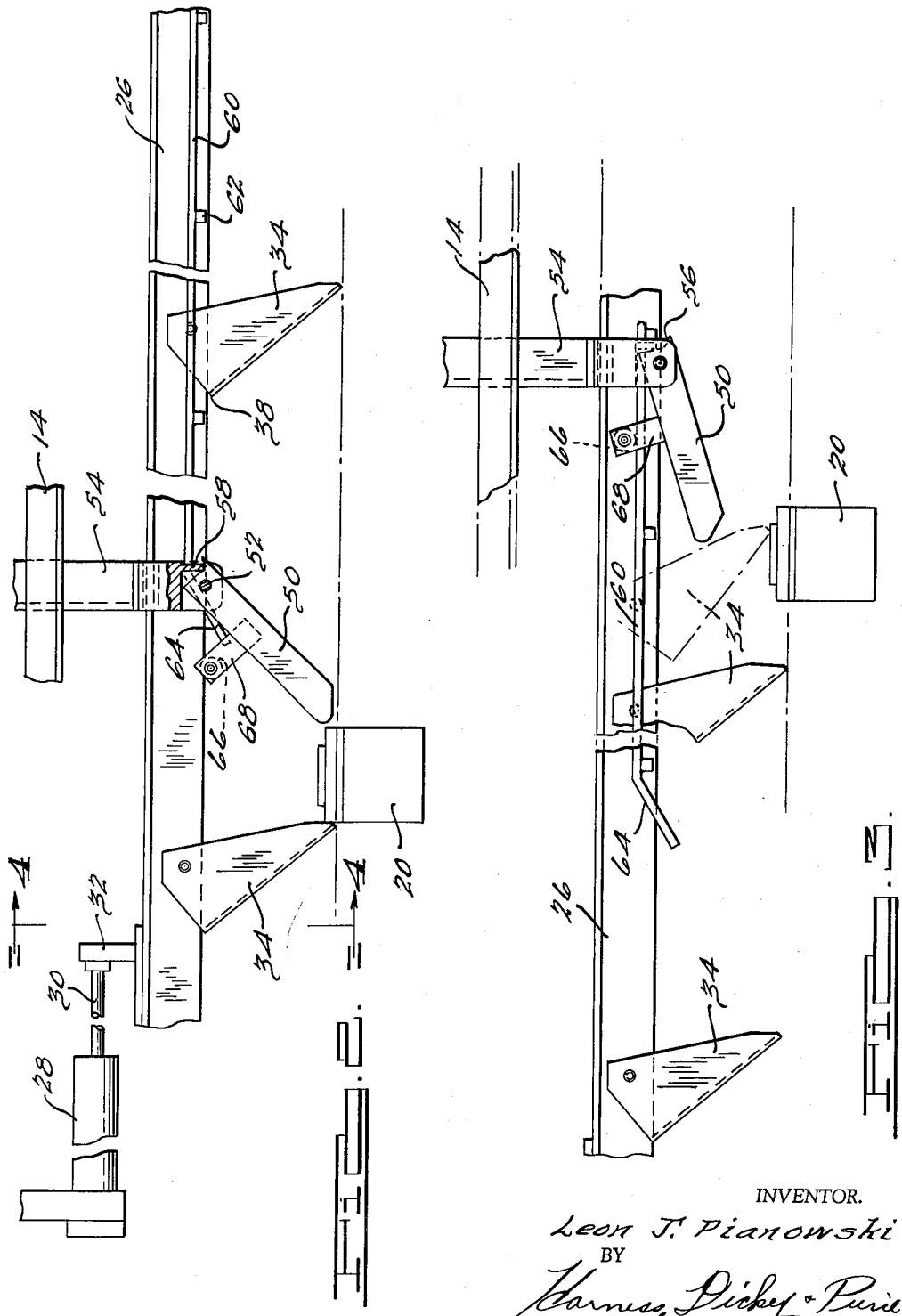

United States Patent Office 2,988,014
Patented June 13, 1961

2,988,014
CARRIER STOP
Leon J. Pianowski, Detroit, Mich., assignor to The Udylite Corporation, Detroit, Mich., a corporation of Delaware
Filed Jan. 7, 1959, Ser. No. 785,521
5 Claims. (Cl. 104—162)

This invention relates generally to material handling and treating apparatus of the type which utilizes work carriers movably supported on horizontal supporting surfaces, and more particularly to stop means on this type of apparatus for positively stopping a carrier in a predetermined moved position.

Material handling apparatus of the above type usually consists of a frame and material treatment tanks arranged in one or more rows below parts of the frame. Some machines use a single work supporting rail and others use a pair of horizontal rails located above each row of tanks. Carriers supporting workpieces are slidably supported on the rails for movement through the treating fluids in the tanks. Horizontally movable pusher dogs are provided for engaging the carriers and moving them horizontally along the rails. An example of a single rail machine is shown in Davis Patent No. 2,591,682, and a double rail machine is shown in application Serial No. 802,797, filed March 30, 1959, owned by the assignees of this invention.

Since it is advantageous from a production standpoint to have the carriers move as fast as possible through the apparatus, there is a possible tendency for the carriers to travel past their desired stop positions. In some instances stopping of a carrier in a specific position is essential to a particular part of the machine operation and as the speed of travel of the carriers in the machine is increased, this over-travel problem becomes greater. This invention provides carrier stop apparatus which is mounted on the frame for engagement with a carrier to positively prevent movement of the carrier past a predetermined stop position.

An object of this invention, therefore, is to provide improved carrier stop means for material handling apparatus.

A further object of this invention is to provide carrier stop apparatus which is positive in action and which is economical to construct and install.

Further objects, features and advantages of this invention will become apparent from a consideration of the following description, the appended claims and the accompanying drawing in which:

FIGURE 1 is a side elevational view of a material handling machine of the type having carrier pusher mechanisms, showing the carrier stop apparatus of this invention in assembly relation with the machine;

FIGURE 2 is an enlarged side elevational view of a portion of the machine shown in FIG. 1, showing the carrier stop apparatus and illustrating the pusher mechanism associated with the stop apparatus in an extended position;

FIGURE 3 is an enlarged side elevational view, illustrated similarly to FIG. 2, showing the pusher mechanism in a retracted position; and FIGURE 4 is a transverse sectional view looking along the line 4—4 in FIG. 2.

With reference to the drawing, the carrier stop apparatus of this invention, indicated generally at 10, is illustrated in FIG. 1 mounted on a material handling machine 12 of the type having pairs of carrier-supporting rails and reciprocating pushers for moving the carriers along the rails. The machine 12 is adapted for particular use in processes such as plating, anodizing, and the like and is described in detail in the above co-pending application.

However, it is to be understood that the apparatus 10 is also useful in a single rail machine. The machine 12 includes a main frame 14 which extends above a series of liquid treatment tanks 16. Arranged directly above the tanks 16, which are arranged in a row, are a pair of work-supporting rails 18 (only one of which is shown) which extend longitudinally of the row of tanks 16. The rails 18 support a plurality of work carriers 20, the number depending upon the number of parts being processed at any one time in the machine 12, which are slidably supported on and extend between the rails 18. When a work carrier 20 is supported on the rails 18, the work on the carrier 20 hangs downwardly into the liquid in a tank 16. During transfer of the work from one tank 16 to another tank 16, the carrier is lifted off the rails 18 to a supported position on a second pair of rails 22 located above the rails 18 whereby the work, indicated diagrammatically at 21 in FIGURE 1 is raised to the elevated position shown so that it can be transferred over partitions separating adjoining tanks 16. A chassis (not shown) lifts the carrier 20 from the rails 18 onto the rails 22.

When the carrier 20 is supported on the rails 18, the work 21 is suspended in the liquid in a tank 16 and is advanced through the tank by the action of a pusher mechanism 24. The pusher mechanism 24 consists usually of two pusher bars 26, corresponding to the rails 18, and only one of which is shown, which are slidably supported on the frame 14 for reciprocating movement relative to the fixed rails 18. The pusher bars are reciprocated by a hydraulic cylinder assembly 28 which has a piston rod 30 connected by a block 32 to one of the pusher bars 26, which are connected so that they move in unison. Each pusher bar 26 carries a plurality of pivotally supported depending pusher dogs 34 each of which extends downwardly to a position adjacent the corresponding rail 18 for engagement with the rear side of a carrier supported thereon.

When the piston rod 30 is extended so that the pusher bars 26 are moved in one direction, namely, toward the right in the machine illustrated in FIG. 1, the pusher dogs 34 engage the carriers 20 and slide them toward the right on the rails 18. When the piston rod 30 is retracted so that the pusher bars 26 are moved toward the left as seen in FIG. 1, the pusher dogs 34 readily move across the carriers 20 since, by virtue of their pivotal mounting, the dogs 34 are readily movable in a counterclockwise direction to the more horizontal position shown in broken lines in FIG. 3, for movement across the top side of a carrier 20. As illustrated in FIG. 2, each dog 34 has an upper end portion 38 engageable with the pusher bar 26 for preventing swinging movement of the dog 34 in a clockwise direction past the position illustrated.

Similar pusher bars 40 and dogs 42 are provided for advancing the carriers 20 on the upper rails 22. Certain operations of the machine 12 may be dependent on the stopping of the carriers 20 in predetermined stop positions on the rails 18 and 22. Since the production capacity of the machine is increased by an increase in the rate of travel of the carriers 20 on the rails 18 and 22, there is a tendency for a carrier 20 to continue its travel after contact with that carrier by its pusher dog 34 is discontinued. Consequently, the carrier stop apparatus 10 is provided at certain selected points on the machine 12 for insuring a stopping of each carrier 20 in the selected position. The apparatus 10 is illustrated applied to a pusher bar 26 but it is to be understood that this is for illustration purposes only since the apparatus 10 is readily applied to the upper pusher bars 40.

A carrier stop apparatus 10 consists of a stop bar 50 (FIGS. 2, 3 and 4) of elongated bar shape which is mounted adjacent its upper end on a horizontal pivot 52 carried by an extension member 54 mounted on the machine frame 14. The stop member 50 is provided adjacent its upper end with a shoulder 56 which is engageable with a shoulder 58 on the extension 54 in the downwardly inclined position of the stop member 50 illustrated in FIG. 2. The weight of the stop member 50 maintains the shoulders 56 and 58 in engagement to prevent rotation of the stop member 50 about the pivot 52 in a counterclockwise direction as viewed in FIG. 2. Consequently, when the stop member 50 is in the position illustrated in FIG. 2, the lower end portion thereof is directly in the path of a carrier 20 being advanced by a dog 34 on the rails 18. The stop members 50 are normally arranged in pairs on the frame 14, corresponding to the rails 18, so that they are aligned transversely of the machine 12. As a result, both ends of a carrier 20 will be engaged by a pair of stop members 50 to positively prevent movement of the carrier 20 past the stop members 50. In a single rail machine, of course, only a single stop member 50 is used at each stop station.

When the piston rod 30 is retracted so that the pusher bars 26 are retracted, namely, moved toward the left as viewed in FIG. 2, in preparation for the next index-in of carriers 20 on the rails 18, horizontal track members 60, which correspond in number to the pusher bars 26 are likewise moved to the left. Each track member 60 is mounted on supporting blocks 62 which are secured to and project outwardly from one side of one of the pusher bars 26 as shown in FIGS. 2 and 3.

At its left end each track 60 has a downwardly inclined ramp portion 64 which terminates at its lower end at a level below the level of a roller 66 rotatably supported on the upper end of an inclined leg 68 secured to the corresponding stop member 50. As a result, the roller 66 travels upwardly on the ramp portion 64 to a supported position on the track 60 thereby swinging the stop member 50 upwardly about its pivot 52 to the position illustrated in FIG. 3. In this position of the stop member 50, it is out of the path of travel of the carrier 20 which was stopped, during the previous advance of the pusher bars 26, by the stop member 50. Consequently, the stop member 50 does not interfere with the subsequent advance of the pusher dogs 34 to advance the carriers 20. Each ramp portion 64 is positioned between adjacent dogs 34 on a pusher rod 26 so that the ramp portion 64 raises the corresponding stop member 50, during retraction of the pusher rod 26, prior to movement of the forward one of the dogs to a position behind the carrier 20 engaged by the stop member 50. Such a location of each ramp portion 64 also insures a location of the corresponding stop member 50 in a lifted position until the carrier 20 has been advanced past the stop member 50 by the forward dog 34. Each track 60 is of a length to maintain the stop member 50 in a lifted position during the remainder of the retraction of the pusher bar 26.

From the above description, it is seen that this invention provides stop members 50 which are operable to positively prevent movement of the carriers 20 past preselected desired stop poistions on the rails 18 and 22. Because the stop members 50 are mounted on the frame 14, a carrier 20 can be stopped in a predetermined exact position which is not subject to variations in stroke of the pusher rods 26. Each stop member 50 is movable between the stop position illustrated in FIG. 2 and a disabled position illustrated in FIG. 3 in which the stop member cannot interfere with movement of a carrier 20 in an advancing direction, namely, a direction toward the right as viewed in FIGS. 2 and 3. This disabling of a stop member 50 is in response to retraction of the associated pusher bar 26 so that the disabling is always accomplished immediately prior to an initial advance of a carrier 20 sufficient to move it past the stop member 50 before the stop member is returned to its stop position.

It will be understood that the specific construction of the improved carrier stop which is herein disclosed and described is presented for purposes of explanation and illustration and is not intended to indicate limits of the invention, the scope of which is defined by the following claims.

What is claimed is:

1. In work handling apparatus which includes a frame, rail means on said frame, movable elements supported on said rail means for movement thereon, and a pusher bar reciprocatable between an advanced and a retracted position having pivotally mounted pusher dogs carried thereon for pushing engagement with said elements for advancing said elements in one direction on said rail means; a stop member on said frame engageable with a movable element in a predetermined position thereof for terminating the advance thereof, means on said stop member engaging cooperating means for maintaining it in a position to stop said movable element in said predetermined position, and means providing for a disabling of said stop means in response to movement of said pusher bar toward said retracted position so that on a subsequent advancing movement of said pusher bar, said stop member will not interfere with the advance of the stopped said movable element.

2. In work handling apparatus which includes a frame, horizontal rail means on said frame, movable elements supported on said rail means for horizontal movement thereon, and a horizontally disposed pusher bar reciprocatable between an advanced and a retracted position having pivotally mounted pusher dogs carried thereon for pushing engagement with said elements for advancing said elements horizontally in one direction on said rail means; a stop member pivotally mounted on said frame for swinging movement between a lower stop position engageable with a movable element on said rail means and an upper position out of the path of an element being advanced on said rail means, means providing for movement of said stop member to said lower stop position after a previously stopped element has been advanced beyond said stop member while in said upper position in response to the advancing movement of said pusher bar, and coacting means on said pusher bar and said stop member providing for movement thereof to said upper position in response to the retracting movement of said pusher bar.

3. In work handling apparatus which includes a frame, horizontal rail means on said frame, movable elements supported on said rail means for horizontal movement thereon, and a horizontally disposed pusher bar reciprocatable between an advanced position and a retracted position having pivotally mounted pusher dogs carried thereon for pushing engagement with said elements for advancing said elements horizontally in one direction on said rail means; a stop member pivotally mounted on said frame for swinging movement between a lower stop position engageable with a movable element on said rail means and an upper position out of the path of an element being advanced on said rail means, and coacting roller and track means on said pusher bar and said stop member providing for movement thereof in response to the advancing movement of said pusher bar to said lower position to stop a movable element in a predetermined position on said rail means adjacent to the extreme point of forward advance of said pusher bar, and to said upper position on the retracting movement of said pusher bar so that said stop member will not interfere with the advance of the stopped said movable element beyond said predetermined position on the next advancing movement of said pusher bar.

4. In work handling apparatus which includes a frame, horizontal rail means on said frame, movable elements supported on said rail means for horizontal movement thereon, and a horizontally disposed pusher bar reciprocatable between an advanced and a retracted position having pivotally mounted pusher dogs carried thereon for pushing engagement with said elements for advancing said elements horizontally in one direction on said rail means; a stop member pivotally mounted on said frame for swinging movement between a lower stop position engageable with a movable element on said rail means and an upper position out of the path of an element being advanced on said rail means, said stop member being mounted so that one portion thereof is maintained in engagement with said frame by the weight of said stop member in the stop position thereof to thereby prevent movement of an element beyond a preselected position on said rail adjacent to the extreme point of forward advance of said pusher bar, a track member having an inclined ramp portion at one end located between a pair of said pusher dogs, said track member being movably mounted on said pusher bar and extending in said one direction from said ramp portion, and roller means on said stop member arranged for travel upwardly on said ramp portion on retraction of said pusher bar to provide for movement of the stop member to said upper position to permit the stopped said movable element to be advanced beyond said preselected position on the next advancing movement of said pusher bar.

5. In a work handling apparatus, the combintion comprising a frame, a supporting rail on said frame, a plurality of independently movable elements movably mounted on said rail, a reciprocating pusher means engageable with said elements for advancing them along said rail on the advancing stroke of said pusher means, a stop member mounted on said frame adjacent to said rail and movable to and from an enabled position and a disenabled position, said stop member when in said enabled position engageable by one of said elements stopping said element at a preselected position on said rail adjacent to the extreme point of forward advance of said pusher means, means for holding said stop member in said enabled position, and means on said pusher means disenabling said stop member to permit said stopped element to be advanced beyond said preselected position on the next advancing stroke of said pusher means.

References Cited in the file of this patent
UNITED STATES PATENTS

| | | |
|---|---|---|
| 1,522,116 | Gray et al. | June 6, 1925 |
| 1,584,031 | Hannauer et al. | May 11, 1926 |
| 2,421,690 | Ensor et al. | June 3, 1947 |
| 2,428,856 | Sinclair | Oct. 14, 1947 |
| 2,575,396 | Schenk | Nov. 20, 1951 |
| 2,624,440 | Hornberger | Jan. 6, 1953 |
| 2,736,441 | Hauck | Feb. 28, 1956 |
| 2,738,888 | Todd et al. | Mar. 20, 1956 |
| 2,832,297 | Daniels | Apr. 29, 1958 |
| 2,863,398 | Granath | Dec. 9, 1958 |